No. 733,020. PATENTED JULY 7, 1903.
C. L. FERRIOTT.
INSECT COLLECTING MACHINE.
APPLICATION FILED MAR. 31, 1902.
NO MODEL. 2 SHEETS—SHEET 1.
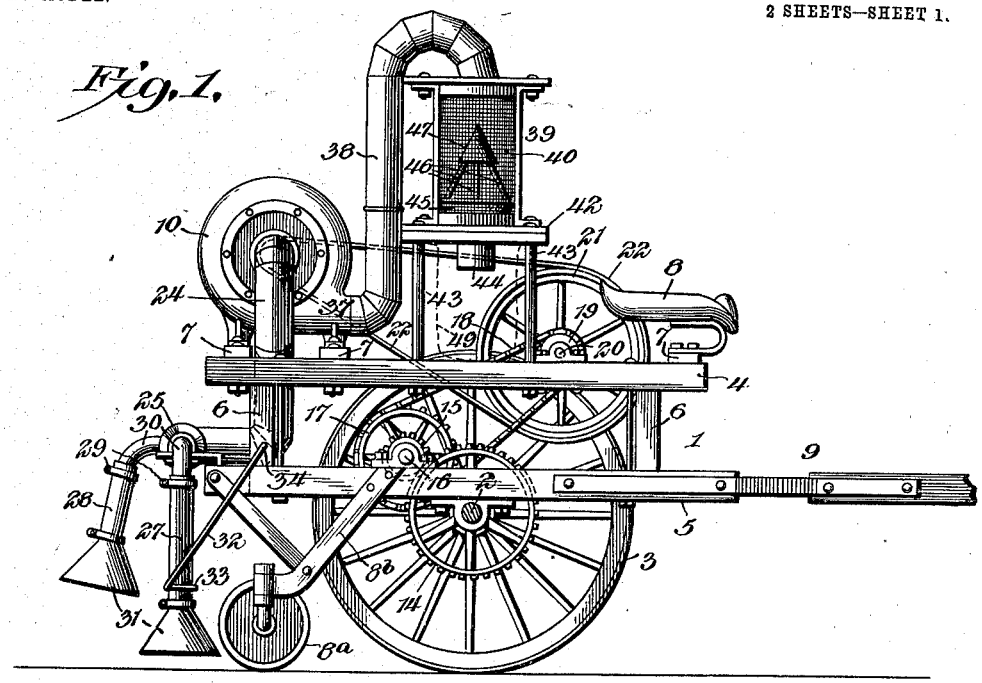
Witnesses
Howard D. Orr.
Louis F. Julihn
Inventor,
Charley L. Ferriott,
By E. G. Siggers.
Attorney No. 733,020. PATENTED JULY 7, 1903.
C. L. FERRIOTT.
INSECT COLLECTING MACHINE.
APPLICATION FILED MAR. 31, 1902.
NO MODEL. 2 SHEETS—SHEET 2.
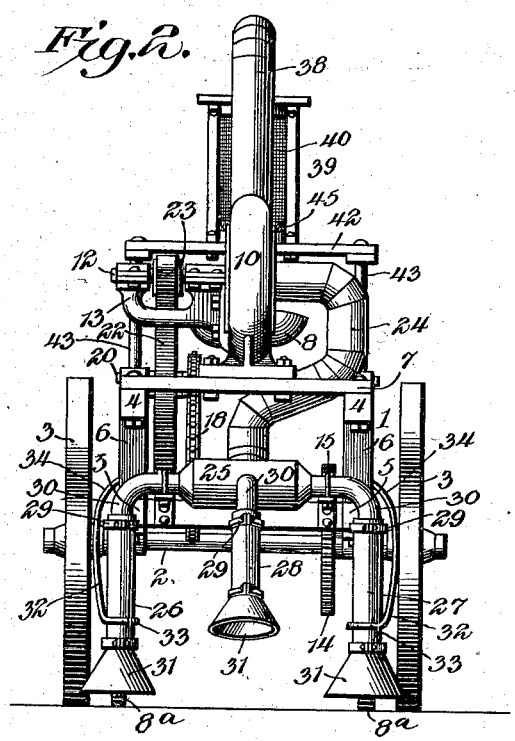
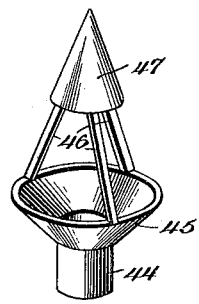
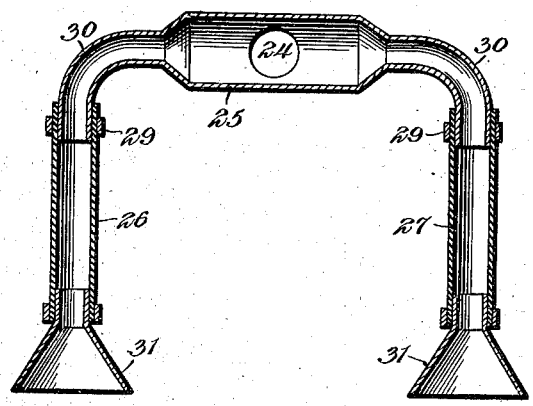
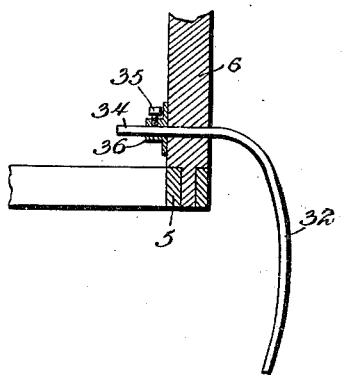

No. 733,020. Patented July 7, 1903.

UNITED STATES PATENT OFFICE.

CHARLEY L. FERRIOTT, OF BARTLETT, TEXAS, ASSIGNOR OF ONE-HALF TO JULIUS DODT, OF BARTLETT, TEXAS.

INSECT-COLLECTING MACHINE.

SPECIFICATION forming part of Letters Patent No. 733,020, dated July 7, 1903.

Application filed March 31, 1902. Serial No. 100,845. (No model.)

*To all whom it may concern:*

Be it known that I, CHARLEY L. FERRIOTT, a citizen of the United States, residing at Bartlett, in the county of Williamson and State of Texas, have invented a new and useful Insect-Collecting Machine, of which the following is a specification.

This invention relates to a novel machine for collecting the cotton-boll weevil and other insects from growing plants and from the ground adjacent thereto.

The object of the invention is to produce a machine designed to be propelled by draft-animals and equipped with suction apparatus operated by the movement of the machine to collect the insects and infected plant forms or squares, which after separation from the dust and dirt drawn up by the machine are discharged into a sack or the like preliminary to the destruction of the insects and infected vegetation.

Another object of the invention is to equip an apparatus of the character specified with a series of suction-tubes, certain of which are arranged to yield laterally against the resistance of adjustable gage-rods, which maintain the suction-tubes in close contiguity to the opposite sides of a row of plants.

A further object of the invention is to provide a separating-chamber within which the separation of the dust and dirt from the insects and injured forms is effected prior to the delivery of the latter to the sack.

Subordinate to these several objects are others, which will hereinafter more fully appear as the necessity for their accomplishment is developed in the succeeding description of that form of my invention which for the purposes of this disclosure I have illustrated in the accompanying drawings.

In said drawings, Figure 1 is a side elevation of my machine with one wheel removed. Fig. 2 is a rear elevation thereof. Fig. 3 is a central longitudinal sectional view of the machine. Fig. 4 is a sectional view through the suction-chamber and the side tubes. Fig. 5 is a detail perspective view of the separating device located within the separating-chamber, and Fig. 6 is a detail view of one of the gage-rods.

Like numerals of reference are employed to designate corresponding parts throughout the views.

The frame of the machine (indicated by the numeral 1) is carried primarily by the axle 2 of the carrying-wheels 3. This frame may obviously be of any desired form, but preferably comprises, as shown, the upper and lower side beams 4 and 5, spaced apart by the vertical posts 6 and transverse frame-bars 7, upon one of which the driver's seat 8 is supported, as shown. The rear end of the frame, the axle 2 being somewhat nearer the front end thereof, is additionally supported by swiveled caster-wheels $8^a$, located at the lower ends of pendent supports $8^b$, secured to the frame.

The draft appliances 9 are connected to the lower beams of the frame, at the front ends thereof, in order to permit the machine to be drawn over the ground by draft-animals in an obvious manner. At the rear end of the frame is supported a fan-casing 10, bolted or otherwise secured to a pair of the transverse bars 7, and within this casing is mounted to rotate a fan 11, the shaft 12 of which is provided with bearings in a bearing-arm 13, extending from the side of the casing. The fan 11 may be driven by the application of power in a variety of ways; but since it is preferable to operate the fan by the traction of the machine I employ a train of gearing between the axle 2 and the shaft 12. This gearing comprises a gear-wheel 14, mounted on the axle and meshing with a pinion 15, keyed upon a shaft 16, supported in suitable bearings mounted on the side beams 5. The shaft 16 is provided in turn with a comparatively large sprocket-wheel 17, geared by means of a sprocket-chain 18 to a comparatively small sprocket-wheel 19, keyed upon a shaft 20, carrying a large belt-wheel 21 and journaled in bearings mounted upon the upper beams 4 of the frame. The belt-wheel 21 is in turn belted by a belt 22 to a belt-pulley 23, fixed upon the shaft 12. By means of this train of multiplying gearing the fan is rotated at a high rate of speed as the machine is drawn over the ground.

The inlet-opening at the side of the fan-casing is in communication with the upper end of a suction-tube 24, leading upwardly from a suction-chamber 25, disposed transversely at the rear end of the machine and preferably supported by one of the transverse frame-bars, as shown. This suction-chamber constitutes, in effect, a union for three flexible suction-tubes 26, 27, and 28, having their upper ends clamped, as by bands 29, upon the curved nipples or elbows 30, extending, respectively, from the opposite ends of the suction-chamber 25 and from the rear side of the latter. At the lower end of each of the several suction-tubes is secured a flared mouthpiece or funnel 31, through which the insects and infected vegetation are drawn up by the action of the fan or blower.

It should be understood that the machine is designed to collect insects and injured squares both from the growing plants and from the ground adjacent to the opposite sides of the plant row. It is for this reason that I have arranged the suction-tubes in the manner shown in order that the funnels of the tubes 26 and 27 will be located in close proximity to the ground at opposite sides of the plant row, while the funnel of the short center tube 28 will be disposed just over the row of plants to detach the insects and injured squares therefrom.

The flexibility of the suction-tubes will permit them to swing laterally to accommodate and straddle a row of plants; but it is not desirable to permit unlimited movement of the tubes, and I therefore provide what may be termed "gage-rods" 32, having loops 33 at their lower ends encircling the tubes and having their upper ends 34 passed through the vertical posts 6 of the frame and adjustably secured by set-screws 35, screwed into cylindrical sockets 36, secured to the posts.
By means of these gage-rods the tubes 26 and 27 may be adjusted laterally to bring their funnels close to the stalks of the plants, notwithstanding the varying widths of the plant rows. At the same time these gage-rods are sufficiently yielding or resilient to permit such lateral movement of the tubes as will prevent the derangement of the latter in the event of their striking an obstruction. The gage-rods and their securing devices may therefore be said to constitute means for adjusting the suction-tubes laterally or yielding gage devices for retaining the suction-tubes yieldingly in various positions.

The discharge-spout 37 of the fan-casing 10 is in communication with the lower end of a vertically-disposed discharge-pipe 38, the upper end of which discharges downwardly into a separating-chamber 39, having open-work side walls 40 and a central opening 41 in its bottom 42, which is supported at a suitable distance above the frame 1 by standards 43. Within this chamber 39 the insects and infected vegetation are designed to be separated from the dust and dirt which may be blown back with them by the action of the fan. I therefore equip the chamber 39 with a separating device comprising a spout 44, passed through the opening 41 in the bottom of the chamber and having a dished receiver 45 located at its upper end within the chamber and supporting, as by the upstanding lugs 46, a deflector 47 of conical form, centered directly under the inlet-opening 48 of the chamber. The insects, forms, and dirt drawn up through the suction-tubes by the action of the fan will be blown back to the separating-chamber and discharged therein from above, and instead of passing directly through to the spout 44, to which a sack or other receptacle 49 is secured, will strike the deflector 47 and be deflected against the open-work walls 40 of the chamber. The dust and dirt will thus be blown through the walls of the separating-chamber with great force; but the insects and forms being too large to escape will drop into the receiver 45 and gravitating through the spout 44 will be deposited in the sack 49 without undue violence or the inflation of the sack.

Briefly, the operation of the machine is as follows: The rotation of the carrying-wheels 3 incident to the progress of the machine over the field will operate the fan 11 at a high rate of speed through the medium of the interposed train of gearing. The suction-tubes 26 and 27, straddling a row of growing plants, and the short center tube 28, located above the plants, will permit the insects and infected vegetation to be drawn from the plants and from the ground at the opposite sides of the row and to be blown back to the separating-chamber 39. Within this chamber the dust and dirt will be separated from the insects and injured forms and the latter will be deposited in the sack, which when full may be removed and the insects exterminated in any desired manner.

It is thought that from the foregoing the construction and operation of my machine will be clearly comprehended; but while the illustrated embodiment of the invention appears at this time to be preferable I do not wish to be understood as limiting myself to the structural details defined, as, on the contrary, I reserve the right to effect such changes, modifications, and variations of the illustrated structure as may be properly embraced within the scope of the protection prayed.

What I claim is—

1. In a machine of the character described, the combination with a vehicle, and a chamber, of a pendent suction-tube having a downwardly-opening funnel at its lower end and arranged to swing laterally, an adjustable gage device for retaining said tube in its laterally-adjusted positions, and a suction device designed to draw insects and infected vegetation through the tube from the ground adjacent to a row of plants and to deposit said insects and vegetation in the chamber.

2. In a machine of the character described, the combination with a vehicle, and a chamber, of a pendent suction-tube having a downwardly-opening funnel at its lower end and arranged to swing laterally, an adjustable reactive gage device for holding the tube yieldingly in different laterally-adjusted positions, whereby it may yield when brought into contact with growing plants without injury to the latter, and a suction device disposed to draw insects and infected vegetation through the tube from the ground adjacent to the plants and to deposit said insects and vegetation in the chamber.

3. In a machine of the character described, the combination with a vehicle and a chamber, of a laterally-movable suction-tube arranged for disposal adjacent to a row of plants, a suction device disposed to draw insects and infected vegetation through the tube and deposit the same in the chamber, a resilient gage-rod connected at its free end to the tube, and means for adjustably retaining the opposite end of said rod.

4. In a machine of the character described, the combination with a vehicle and a chamber, of a flexible suction-tube arranged for disposal adjacent to a row of plants and provided with a funnel at its lower end, a spring gage-rod for yieldingly retaining the tube in proper position, and a suction device disposed to draw insects and infected vegetation through the tube and deposit the same in the chamber.

5. In a machine of the character described, the combination with a vehicle and chamber, of a flexible suction-tube arranged for disposal adjacent to a row of plants, and provided with a funnel mounted at its lower end, a spring gage-rod having a terminal loop encircling the tube adjacent to the funnel and having its upper end disposed horizontally, a socket for the reception of the upper end of the gage-rod, a set-screw for retaining the gage-rod in adjusted positions, and a suction device disposed to draw insects and infected vegetation through the tube and deposit the same in the chamber.

6. In machine of the character described, the combination with a vehicle and a chamber, of a pair of vertically-disposed suction-tubes arranged for disposal at opposite sides of a row of plants, a short center tube arranged between the suction-tubes for disposal above the row of plants, and a suction device disposed to draw insects and infected vegetation through the several tubes and deposit the same in the chamber.

7. In a machine of the character described, the combination with a vehicle and a chamber, of a pair of laterally-adjustable substantially vertical suction-tubes, means for yieldingly retaining said tubes in their adjusted positions, a short center tube disposed intermediate of the adjustable tubes, and a suction device disposed to draw insects and infected vegetation through the several tubes and deposit the same in the chamber.

8. In a machine of the character described, the combination with a vehicle and a chamber, of a pair of suction-tubes, adjustable gage-rods connected to said tubes to retain them in different positions, a short center tube, funnels located at the lower ends of the several tubes, and a suction device disposed to draw insects and infected vegetation through the tubes and deposit the same in the chamber.

9. In a machine of the character described, the combination with a vehicle and a chamber, of a suction-chamber, a suction device intermediate of and communicating with both of said chambers, a pair of substantially vertical suction-tubes extending from the opposite ends of the suction-chamber, and a short center tube extending from the suction-chamber intermediate of its ends, each of said tubes being provided with funnels at their lower ends.

10. In a machine of the character described, the combination with a vehicle and a suction-tube, of a separating-chamber, a suction device disposed to draw insects and infected vegetation through the suction-tube and deposit the same in the chamber, and a separating device located within the chamber for separating the dust and dirt from the insects and vegetation.

11. In a machine of the character described, the combination with a vehicle and a suction-tube, of a separating-chamber, a suction device disposed to draw insects and infected vegetation through the tube and deposit the same in the chamber, said chamber being provided with perforate walls and having an outlet, and a deflector located within the chamber opposite the outlet and serving to deflect the dust and dirt through the walls of the chamber, and thereby separate the same from the insects and infected vegetation.

12. A separating-chamber for machines of the character described, having perforate walls, an inlet and an outlet at its opposite ends, and a conical deflector intermediate of the inlet and outlet to deflect the material through said walls.

13. In a machine of the character described, the combination with a separating-chamber having perforate walls and provided with an inlet and an outlet at its opposite ends, of a spout passed through the outlet and provided with a dished receiver located within the chamber, and a deflector supported above the receiver.

14. In a machine of the character described, the combination with a separating-chamber having perforate walls, an inlet at its upper end and an outlet at its lower end, of a spout passed through the outlet of the chamber, a dished receiver located within the chamber at the upper end of the spout, and a conical deflector supported above the dished receiver and in line between the inlet and outlet of the chamber.

15. In a machine of the character described, the combination with a vehicle and a chamber, of three substantially vertical suction-tubes spaced apart, the middle tube being shorter than the other tubes, and a suction device disposed to draw insects and infected vegetation through the tubes and deposit the same in the chamber.

16. In a machine of the character described, the combination with a vehicle and a chamber, of a pair of laterally-adjustable substantially vertical suction-tubes disposed at the rear end of the machine, spring gage-rods for yieldingly retaining the tubes against outward movement, a short center tube, funnels carried at the lower ends of the several tubes, and a suction device disposed to draw insects and infected vegetation through the tubes and deposit the same in the chamber.

In testimony that I claim the foregoing as my own I have hereto affixed my signature in the presence of two witnesses.

CHARLEY L. FERRIOTT.

Witnesses:
J. H. WALLACE,
J. F. ZNEERNEMANN.